United States Patent
Stremlau et al.

(10) Patent No.: US 11,693,968 B2
(45) Date of Patent: Jul. 4, 2023

(54) EMBEDDED CONTROLLER FOR UPDATING FIRMWARE OF ANOTHER DEVICE COMPONENT

(71) Applicant: Lenovo (Singapore) Pte. Ltd., Singapore (SG)

(72) Inventors: Thorsten P. Stremlau, Morrisville, NC (US); Kevin Wayne Beck, Raleigh, NC (US); Russell Speight VanBlon, Raleigh, NC (US); Joseph M. Pennisi, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 384 days.

(21) Appl. No.: 17/118,595

(22) Filed: Dec. 10, 2020

(65) Prior Publication Data
US 2022/0188419 A1    Jun. 16, 2022

(51) Int. Cl.
*G06F 21/57*    (2013.01)
*G06F 8/65*    (2018.01)
*G06F 21/64*    (2013.01)

(52) U.S. Cl.
CPC .............. *G06F 21/572* (2013.01); *G06F 8/65* (2013.01); *G06F 21/64* (2013.01)

(58) Field of Classification Search
CPC .......... G06F 21/572; G06F 8/65; G06F 21/64; G06F 11/1433; G06F 12/00; G06F 16/184; G06F 9/4401; G06F 9/445; H04N 21/26291; H04N 21/42204; H04N 21/4586; H04M 1/72406
See application file for complete search history.

(56) References Cited

U.S. PATENT DOCUMENTS

| | | | |
|---|---|---|---|
| 10,776,102 B1* | 9/2020 | Dsouza | G06F 21/78 |
| 2007/0078957 A1* | 4/2007 | Ypya | G06F 21/10 709/222 |
| 2015/0261521 A1* | 9/2015 | Choi | H04L 9/3236 713/176 |
| 2019/0384586 A1* | 12/2019 | Jiang | H04L 9/006 |
| 2021/0096837 A1* | 4/2021 | Kim | G06F 21/74 |
| 2021/0182398 A1* | 6/2021 | Schack | G06F 8/63 |

\* cited by examiner

*Primary Examiner* — Daniel B Potratz
*Assistant Examiner* — Arif Khan
(74) *Attorney, Agent, or Firm* — John M. Rogitz; John L. Rogitz

(57) ABSTRACT

In one aspect, an embedded controller (EC) in a device may receive a firmware update for another component in the device and determine whether the firmware update has been previously applied at the component. If the firmware update has not been previously applied, the EC may assign an identifier to the firmware update and digitally sign the identifier. The EC may then provide the firmware update and the digitally-signed identifier to the component so that the component may apply the firmware update.

20 Claims, 5 Drawing Sheets

EMBEDDED CONTROLLER FOR UPDATING FIRMWARE OF ANOTHER DEVICE COMPONENT

FIELD

The present application relates to technically inventive, non-routine solutions that are necessarily rooted in computer technology and that produce concrete technical improvements. In particular, the present application relates to techniques for updating device firmware.

BACKGROUND

As recognized herein, many subsystem devices in a computer have updateable firmware but do not have the ability to determine whether an attempted update is authorized or even if the update relates to the most current or up-to-date version of the firmware. For example, an update presented to the computer may still not be a most up-to-date version of the firmware and may instead be an old "update" introduced by a hacker to instigate a "replay attack" where a now-known vulnerability in the old update is used to hack the computer and perpetrate any number of harmful acts. There are currently no adequate solutions to the foregoing computer-related, technological problem.

SUMMARY

Accordingly, in one aspect a device includes at least one processor and storage accessible to the at least one processor. The storage includes instructions executable by the at least one processor to receive, at an embedded controller (EC), firmware update data, a first digital signature associated with a component at which the firmware update data is to be applied, and a first identifier that identifies the EC. The instructions are also executable to determine, at the EC and using the first digital signature, that the firmware update data has been received from the component. The instructions are then executable to determine, using the first identifier, that the EC is to act upon the firmware update data. Based on the determination that the firmware update data has been received from the component and based on the determination that the EC is to act upon the firmware update data, the instructions are executable to hash the firmware update data to render a first hash. The instructions are then executable to determine that the firmware update data has not been previously applied at the device based on the first hash not matching one or more other hashes already stored at the device. Based on the determination that the firmware update data has not been previously applied at the device, the instructions are executable to generate, using the EC, a first digital certificate including a second identifier and a second digital signature. The second digital signature signs the firmware update data, and the second identifier identifies the firmware update data. Based on the determination that the firmware update data has not been previously applied at the device, the instructions are also executable to generate, using the EC, a second digital certificate including an indication identifying the component at which the firmware update data is to be applied and including a third digital signature signing the second identifier as coming from the EC. The instructions are then executable to send the firmware update data, the first digital certificate, and the second digital certificate to the component to apply the firmware update data.

In some examples, the instructions may also be executable to send a key to the component, where the key may be usable by the component to validate the second and third digital signatures.

Also in some examples, the at least one processor may include the EC.

Still further, in some example implementations the instructions may be executable to receive, at the component to which the firmware update data is to be applied, the first and second digital certificates. In these implementations, the instructions may then be executable to validate the second and third digital signatures as respectively indicated in the first and second digital certificates and, responsive to validating the second and third digital signatures, applying the firmware update data at the component. If desired, the second and third digital signatures may both be validated using the same key, where the key may be received from the EC.

Also, if desired the instructions may be executable to control the component to send the firmware update data, the first digital signature, and the first identifier to the EC for receipt by the EC.

In various example implementations, the EC may be an application-specific integrated circuit (ASIC) and/or a field-programmable gate array (FPGA).

If desired, the firmware update data may include an update to the firmware code executed by the component, and/or may include settings that are to be used by the component while executing firmware code for the component.

In some example implementations, the first digital certificate may not include the second digital certificate, and the second digital certificate may not include the first digital certificate. In some examples, the first digital certificate may include a timestamp indicating a date and/or time at which the second digital signature was generated.

The component itself may be established by hardware of the device that is different from the EC in example embodiments.

In another aspect, a method includes receiving, at an embedded controller (EC) of a device, firmware update data for a component of the device and also receiving, at the EC, a first identifier that identifies the EC. The method then includes determining, at the EC and using the first identifier, that the EC is to act upon the firmware update data. Based on determining that the EC is to act upon the firmware update data, the method includes hashing the firmware update data at the EC to render a first hash. The method then includes determining, at the EC, that the firmware update data has not been previously applied at the device based on the first hash not matching one or more other hashes already stored at the device. Based on determining that the firmware update data has not been previously applied at the device, the method includes generating, using the EC, a first digital certificate including a second identifier and a first digital signature. The first digital signature signs the firmware update data, and the second identifier is associated with the firmware update data. Based on determining that the firmware update data has not been previously applied at the device, the method also includes generating, using the EC, a second digital certificate including an indication identifying the component at which the firmware update data is to be applied and including a second digital signature signing the second identifier as coming from the EC. The method then includes transmitting the firmware update data, the first digital certificate, and the second digital certificate from the EC to the component for the component to apply the firmware update data.

In some examples, the method may include receiving, at the EC, a third digital signature associated with the component as generated by the component. In these examples, the method may then include determining, at the EC and using the third digital signature, that the firmware update data has been received at the EC from the component. Based on determining that the firmware update data has been received at the EC from the component, the method may include hashing the firmware update data at the EC to render the first hash.

Also in some examples, the method may include generating, at the EC and after receiving the firmware update data, a key pair. A first key of the key pair may be used to generate the first and second digital signatures. The method may then include transmitting a second key of the key pair to the component, where the second key may be different from the first key and may be usable to validate the first and second digital signatures.

Additionally, in some example implementations the firmware update data may be first firmware update data that is different from second firmware update data received prior to the first firmware update data. The second firmware update data may be used to establish one of the one or more other hashes already stored at the device, and the second firmware update data may already be applied at the component prior to applying the first firmware update data.

In still another aspect, at least one computer readable storage medium (CRSM) that is not a transitory signal includes instructions executable by at least one processor to receive, at an embedded controller (EC) of a device, firmware update data for a component of the device and also receive, at the EC, a first identifier that identifies the EC. The instructions are then executable to determine, at the EC and using the first identifier, that the EC is to act upon the firmware update data. Based on determining that the EC is to act upon the firmware update data, the instructions are executable to hash the firmware update data at the EC to render a first hash. The instructions are then executable to determine, at the EC, that the firmware update data has not been previously applied at the device based on the first hash not matching one or more other hashes already stored at the device. Based on determining that the firmware update data has not been previously applied at the device, the instructions are executable to generate, using the EC, a first digital certificate including a second identifier and a first digital signature. The first digital signature signs the firmware update data, and the second identifier is associated with the firmware update data. Based on determining that the firmware update data has not been previously applied at the device, the instructions are also executable to generate, using the EC, a second digital certificate including an indication identifying the component at which the firmware update data is to be applied and including a second digital signature signing the second identifier as coming from the EC. The instructions are then executable to transmit the firmware update data, the first digital certificate, and the second digital certificate from the EC to the component for the component to apply the firmware update data.

In some example implementations, the instructions may be executable to receive, at the EC, a third digital signature associated with the component as generated by the component. In these implementations, the instructions may then be executable to determine, at the EC and using the third digital signature, that the firmware update data has been received at the EC from the component. Based on determining that the firmware update data has been received at the EC from the component, the instructions may be executable to hash the firmware update data at the EC to render the first hash.

The details of present principles, both as to their structure and operation, can best be understood in reference to the accompanying drawings, in which like reference numerals refer to like parts, and in which:

DETAILED DESCRIPTION

Figure 1:
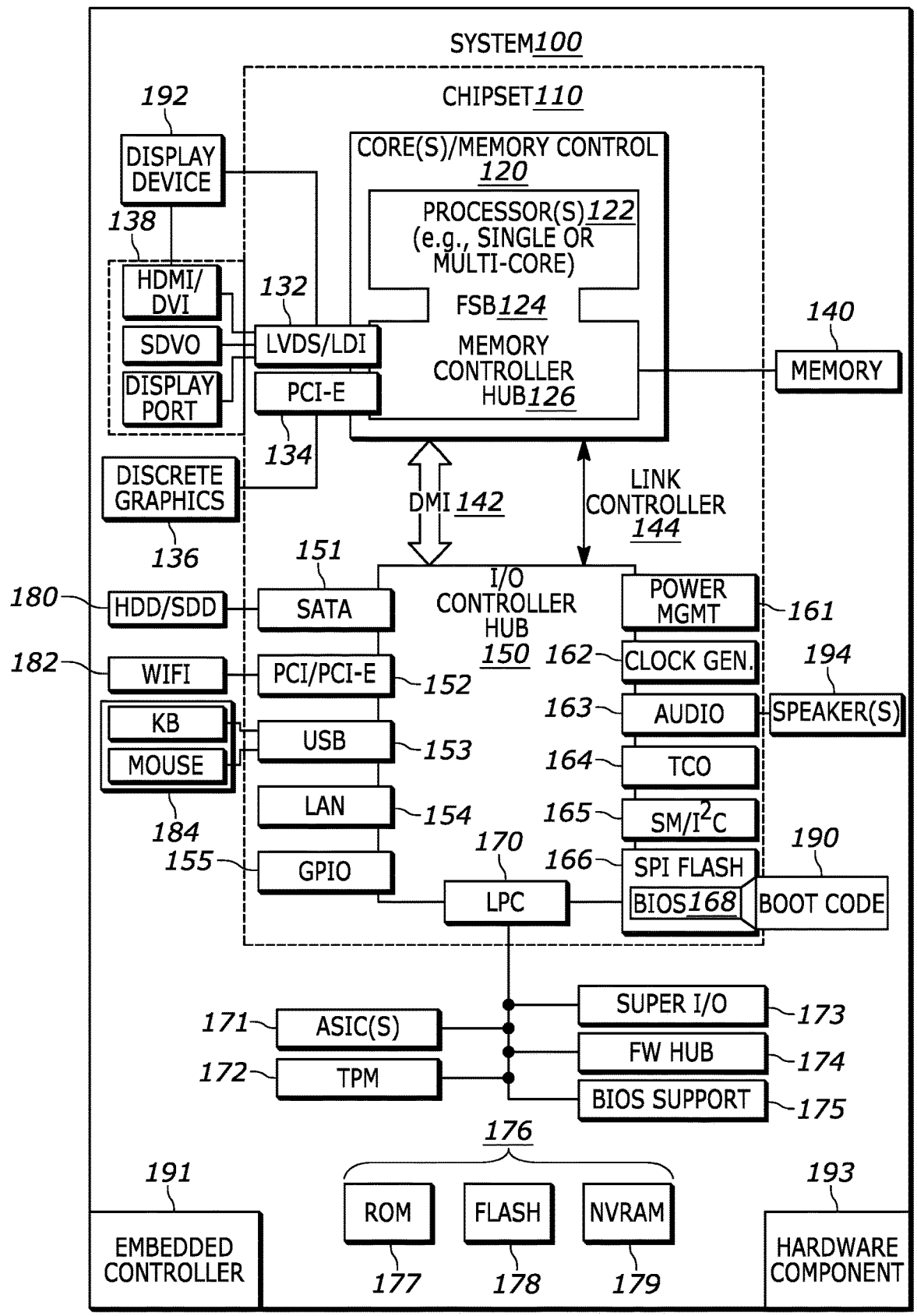
FIG. 1 is a block diagram of an example system consistent with present principles.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system may include an embedded controller (EC) 191 such as a microprocessor, application-specific integrated circuit (ASIC), field-programmable gate array (FPGA), etc. that may be configured to execute certain actions as described further below, to store keys, secrets, hashes, etc. as described below, and to communicate with a hardware component 193 that is to have its firmware code and/or settings updated. Thus, it is to be understood that the component 193 may be established by hardware of the system 100 that is different from the EC 191 itself. The component 193 may be, for example, a mouse cursor track pad, a keyboard, a mouse, a camera, a microphone, a printer, a network interface, etc.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122.

Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
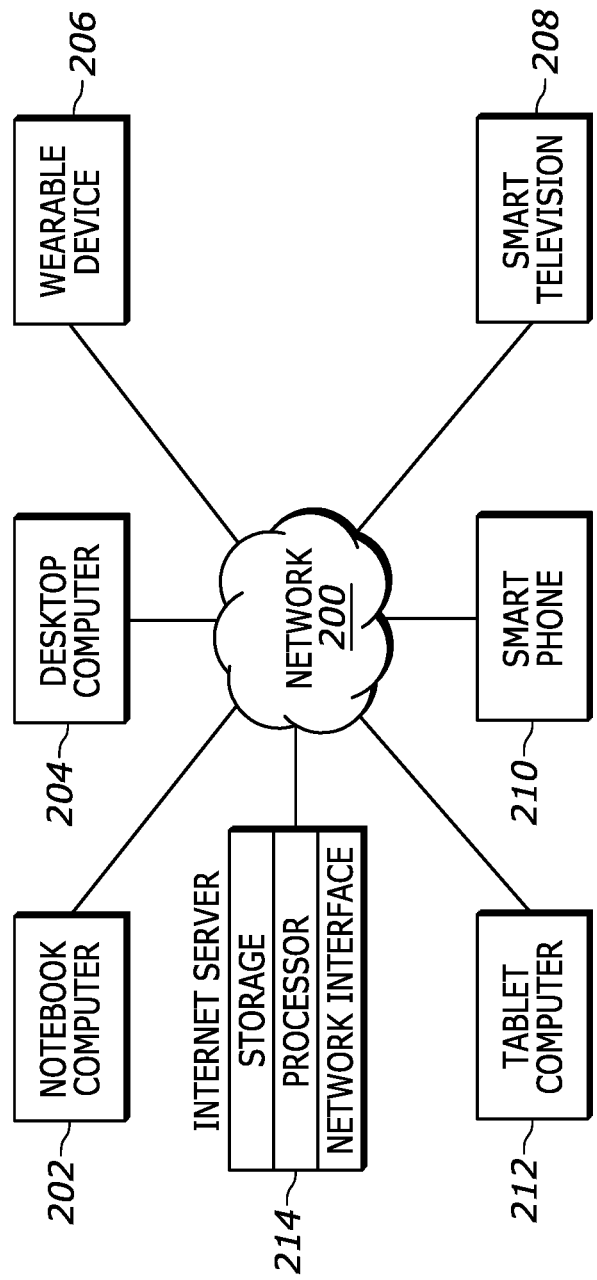
FIG. 2 is a block diagram of an example network of devices consistent with present principles.

Turning now to FIG. 2, example devices are shown communicating over a network 200 such as the Internet in accordance with present principles, such as to provide firmware update data from a server or other device to a client device/end-user device so that the data may be applied at the end-user device. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles, e.g., to transmit firmware update data to be applied at a device.

Figure 3:
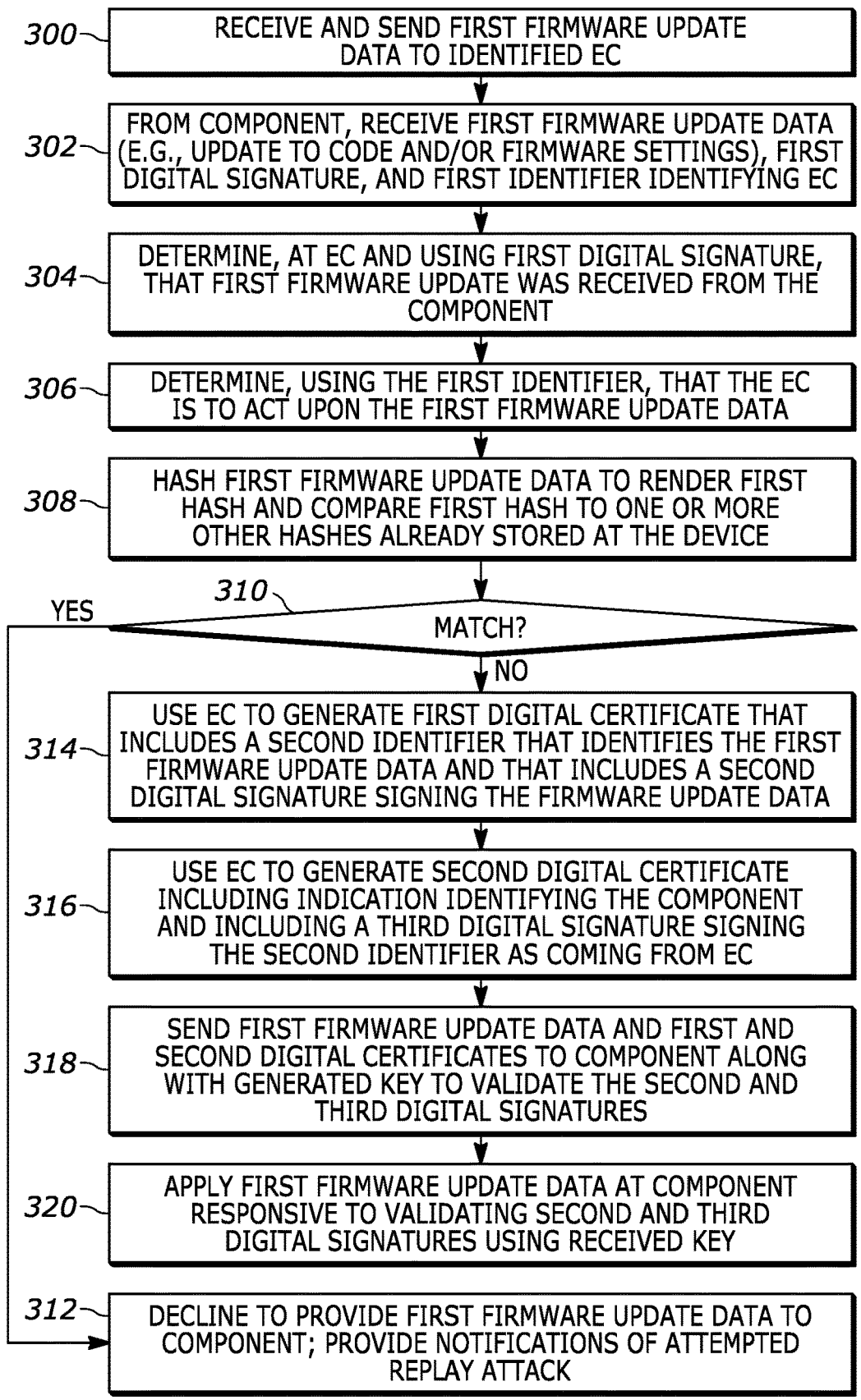
FIG. 3 illustrates example logic in example flow chart format consistent with present principles.

Referring now to FIG. 3, it shows example logic that may be executed by a device such as the system 100 consistent with present principles. For example, the device may be any of various types of computers for which first firmware update data is to be applied to a hardware component within for the hardware component to function according to the update data. Note that some steps below (such as steps 300 and 320) may be executed by a microprocessor in the hardware component itself, while other steps (such as steps 302-318) may be executed by an embedded controller (EC) as described herein.

Beginning at block 300, the device may receive the first firmware update data at the hardware component itself, at a network interface card, and/or at a central processing unit (CPU) of the device. In addition to receiving the first firmware update data, a first digital signature or authenticity certificate may also be received at block 300.

The first firmware update data may include an update to the firmware code executed by the processor in the component and/or may include settings that are to be used by the component while executing the firmware code for the component. In some examples, the first firmware update data may also indicate a first identifier that is unique to the EC so that the component to be updated (or other device component that received the data) knows where to route the first firmware update data itself, also at block 300. However, in other examples the component to be updated (or other device component that received the data) may itself attach or otherwise include the first identifier with the first firmware update data and send both to the EC at block 300. The first identifier itself may be, for example, a unique user identification (UUID). Additionally or alternatively, it may be a unique bit pattern, a unique device secret, etc. that uniquely identifies the EC.

From block 300 the logic may then proceed to block 302. At block 302 the EC may receive, from the hardware component, the first firmware update data, the first digital signature as associated with the hardware component itself or associated with a trusted source from which the first firmware update data came (e.g., the third-party developer of the firmware), and the first identifier that identifies the EC.

After block 302 the logic may proceed to block 304. At block 304 the EC may determine, using the first digital signature, that the first firmware update data has been received from the component or trusted third party (e.g., software developer). For example, the EC may use a public key provided by the hardware component or software developer to validate the digital signature as coming from the source associated with the public key itself. The logic may then move to block 306.

At block 306 the EC may determine, using the first identifier, that the EC is to act upon the first firmware update data. Again, the first identifier may be a unique secret, UUID, predetermined bit pattern, or other type of indication that uniquely identifies the EC itself so that the EC can recognize it and know it is supposed to act upon the first firmware update data (e.g., rather than another EC or other component within the device). Having the EC only act upon the first firmware update data based on identifying its identifier may help prevent the EC from participating in a mass denial of service attack for example, where plural ECs and other device components might be indiscriminately targeted by a hacker, bot, etc. in order to trick one or more of the components into a desired outcome when it should not have performed any functions to begin with.

From block 306 the logic may then proceed to block 308. At block 308 and based on the determination that the first firmware update data has been received from the component (or other trusted source) and based on the determination that the EC is to act upon the first firmware update data, the EC may hash the first firmware update data to render a first hash. Example hash algorithms that may be used include MD5 (Message-Digest algorithm 5) and SHA-1 (Secure Hash Algorithm), although others may be used as well. Some example hashes that are generated may consist of two hundred fifty six bits, though hashes of other lengths may also be used.

Also at block 308, the EC may compare the first hash to one or more other hashes already stored at the device to determine, at decision diamond 310, whether the first firmware update data has been previously applied at the device. The other hashes already stored at the device may be hashes of other firmware update data for the same hardware component as previously received and possibly applied to the hardware component (e.g., prior to block 300). For example, the other hashes may be respective hashes of second, third, and fourth firmware update data corresponding to sequential updates that were released by the firmware's developer prior to releasing the first firmware update data. In some examples, the first hash and the other hashes may be stored in protected storage within the EC itself.

Thus, at diamond 310 the EC may determine whether the first hash matches (e.g., is the same as) at least one other hash already stored at the EC. An affirmative determination may result at diamond 310 if, for example, the first firmware update data is actually firmware update data that has already been received and applied that the component itself (as indicated by a hash match where both firmware update data sets that were matched were hashed using the same hash algorithm). Responsive to an affirmative determination at diamond 310, the logic may move to block 312 as shown in FIG. 3.

At block 312 the EC may decline to provide the first firmware update data to the component to which it is targeted. In some examples, at block 312 the EC may also provide a notification of an attempted replay attack, such as by sending an email, text message, or other notification to an end-user of the device, a system administrator, a manufacturer of the device, etc. The EC may either control a network interface to itself transmit the message, and/or the EC may work with the device's CPU or another processor for the other processor to do sent the message through the network interface.

However, note that where a negative determination is made at diamond 310, the logic may instead proceed to block 314 based on the first hash not matching other hashes already stored in the EC or elsewhere. At block 314 and based on the determination that the first firmware update data has not been previously applied at the device, the EC may generate a new pair of keys (or use a pre-stored key pair) and use the private key from the pair to generate a first digital certificate that includes a second identifier and a second digital signature. The second digital signature may digitally sign the first firmware update data that is to be provided back to the component by the EC.

The second identifier may identify the first firmware update data itself. For example, the EC may use a sequential numbering system or other suitable identification means to assign a unique identifier to each new firmware update data set it receives. For instance, the update data sets may be assigned respective numbers beginning with the number one, then the number two, and continuing to the number N as additional firmware update data sets are received.

Also, note that in addition to including the second identifier, the first digital certificate generated at block 314 may also include a timestamp. The timestamp may indicate a date and/or time of day at which the second digital signature was generated.

After block 314, the logic may proceed to block 316. At block 316, also based on the determination that the first firmware update data has not been previously applied at the device, the EC may generate a second digital certificate that includes an indication identifying the component at which the first firmware update data is to be applied. This may be done so that once the indication is ultimately received by the component as part of the second digital certificate, it may be identified by the component to know the component is being called upon to apply the first firmware update data. The second digital certificate may also include a third digital signature that digitally signs the second identifier itself (from the first digital certificate) as coming from the EC.

The indication identifying the component may be, for example, a hardware ID, a hardware name (e.g., "device track pad"), or any other identifier that uniquely identifies within the device the hardware component to which the first firmware update data is to be applied. Also, note that in some examples the second digital certificate may be generated using the same private key generated at block 314 and used to generate the first digital certificate. However, in other examples the first and second digital certificates may be generated using different private keys from different respective key pairs generated by the EC and/or stored at the EC. In any case, it may be appreciated based on the foregoing that the first digital certificate may not include the second digital certificate, and the second digital certificate may not include the first digital certificate.

After block 316 the logic may then proceed to block 318. At block 318 the EC may send/transmit the first firmware update data, the first digital certificate (which signs the first firmware update data itself), and the second digital certificate to the component to be updated for the component to apply the first firmware update data at the component itself. Again, applying the first firmware update data may include updating the firmware code itself that is executed by the component to control the component, and/or may include applying or updating settings that are to be used by the component while executing the firmware code. Also at block 318, the EC may send/transmit the public key(s) of the pair(s) it generated or accessed at block 314 to the component so that the component can use the public key(s) to validate the first and second digital signatures.

The logic may then move from block 318 to block 320 where the component itself may receive the first firmware update data along with the public key(s), first digital certificate, and second digital certificate. Also at block 318, the component may use its internal processor to apply the first firmware update data after and responsive to validating the second and third digital signatures, using the received public key(s), as respectively indicated in the first and second digital certificates.

Figure 4:
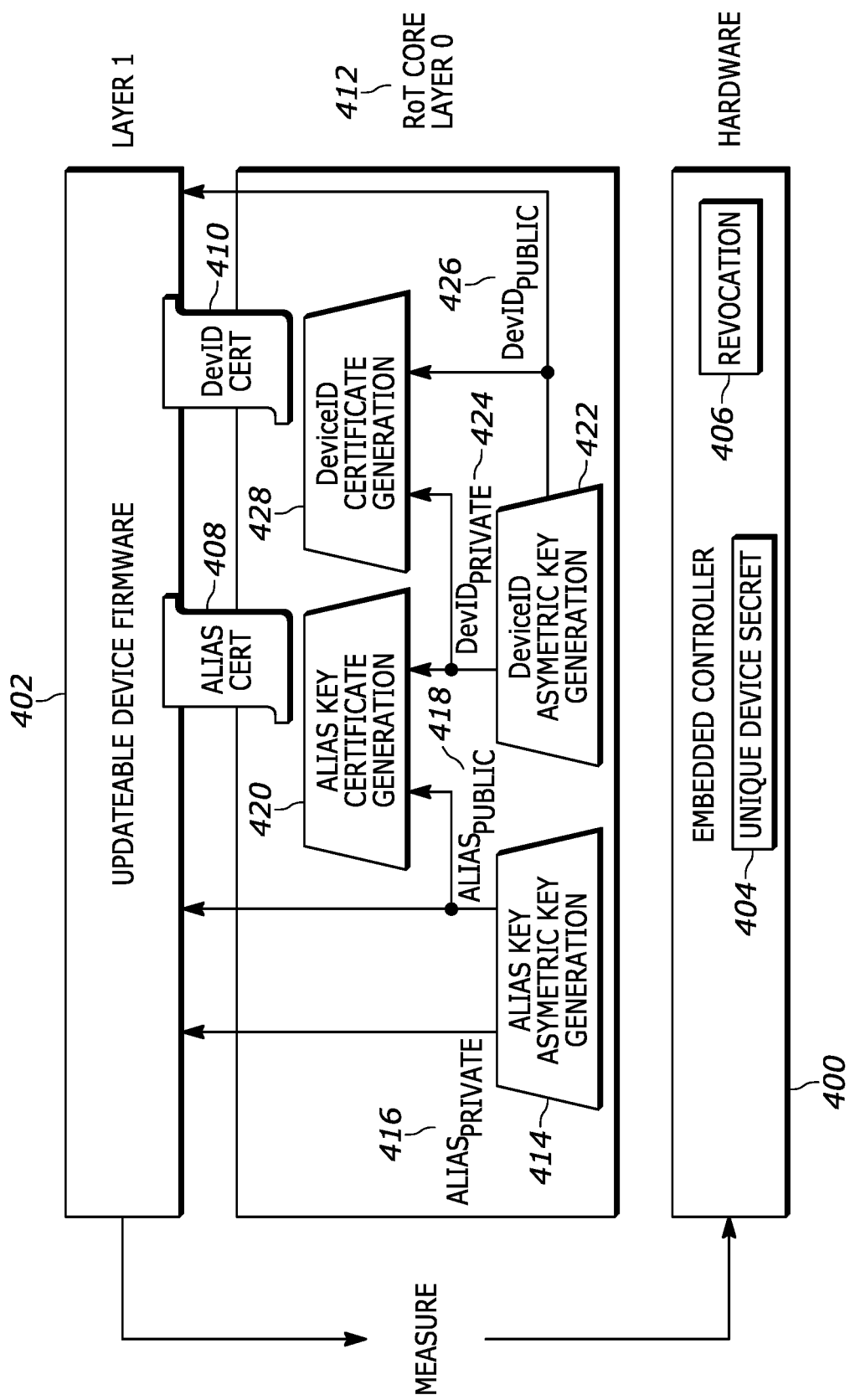
FIG. 4 is an example schematic diagram of an embedded controller operating consistent with present principles.

Now describing FIG. 4, it shows an example schematic diagram consistent with present principles. As shown, an embedded controller (EC) 400 may be disposed within a device such as a laptop computer, desktop computer, smartphone, tablet computer, etc. The EC 400 may function as a root of trust controller for updatable device firmware 402 and may be used to update firmware code and/or settings of the firmware 402 for use by a component within the device such as a track pad or camera or microphone consistent with present principles.

Accordingly, a firmware update (e.g., code update and/or new settings) with a basic digital signature and/or an authenticity certificate may be introduced to the device from outside, such as from a remotely-located server pushing the firmware update to the device. The firmware update may be sent from the related component itself, or from another part of the device that received the firmware update, to the EC 400 once received at the device. Again note that the EC 400 may be an ASIC or FPGA, for example, though other suitable ECs may also be used.

As also shown in FIG. 4, the EC 400 may store one or more unique device secrets 404 indicating data that, upon also being received and recognized by the EC 400, cues the EC that it is to act upon a firmware update consistent with present principles. The EC 400 may also store a revocation list and/or table 406. The list or table 406 may include, for example, a relational database listing previously-applied updates by identifier (e.g., a number assigned by the EC 400) and correlating each identifier with a hash of the update that was rendered previously by the EC 400 prior to the respective update being performed in the past. In some examples, the list or table 406 may also include, for each entry in the list, a respective key (e.g., public key) previously used by the EC 400 to verify that the respective update was actually signed by the same component itself that was updated using the update.

Accordingly, upon receiving a firmware update, the EC 400 may check the update to confirm that the update came from a trusted source (such as the component itself) using the respective trusted source's public key as may already be stored within the EC 400 at the list or table 406. The EC 400 may then run a hash on the new update to check for modification and/or novelty of the update. The source and contents of the update may thus be verified by the EC 400 (e.g., by comparing the new hash to previously-stored hashes from the list or table 406 to determine if the firmware update is actually new). The EC 400 may then generate an EC certificate to prove that these items have been verified.

Thereafter, the EC 400 may use an alias key asymmetric key generation module 414 to generate alias private and public keys 416, 418. The EC 400 may then use the private key 416 and alias key certificate generation module 420 to generate an alias key certificate 408 that, in some examples, may be similar to the first digital certificate described in reference to FIG. 3. In some examples, as shown in FIG. 4 one or both of the keys 416, 418 may be provided to the updateable device firmware 402 itself e.g., for performance of certificate validations consistent with present principles.

The forgoing approach may help addresses a replay attack, such as a previously-verified update with a later discovered vulnerability being re-used to hack the device, by generating the alias key certificate 408 that numbers/date stamps the update(s) (e.g., creates a counter) so that once a respective update is applied, the update cannot be re-used/re-applied since it would be recognized as having the same number as an already-applied update but a different date stamp.

As also shown in FIG. 4, the EC 400 may also use a device ID key generation module 422 to generate device ID private and public keys 424, 426. The EC 400 may then use the private key 424 and device ID certificate generation module 428 to generate a device ID certificate 410 that, in some examples, may be similar to the second digital certificate described in reference to FIG. 3. Thus, the device ID certificate 410 may assert that the update data is coming from the EC 400 as expected, such as from the root of trust core layer 412 of the EC 400. In some examples, as shown in FIG. 4 the keys 424, 426 may be respectively routed/provided to other items in the diagram such as the module 420, 428 and the updateable device firmware 402 itself e.g., for performance of certificate generation and validations consistent with present principles.

Thus, the update may now be associated with three certificates, including the original authenticity certificate provided by the component to the EC 400 when the update itself was provided to the EC 400. Also included may be the separate EC certificate that may include a verified base signature of the EC 400 and the contents of the update, and the alias certificate 408 that may in some examples act like an electronic notary that date stamps the update and helps invalidate any earlier versions of the components firmware.

One of more of the certificates in the paragraph immediately above may be combined/grouped together with the device ID certificate 410 and sent with the update to the target component and/or subsystem device that is to be updated with the firmware update. The component or subsystem device may then use its own processor to accept and apply the update due to it after verifying the firmware update as being authorized by the EC 400/Root of Trust.

Figure 5:
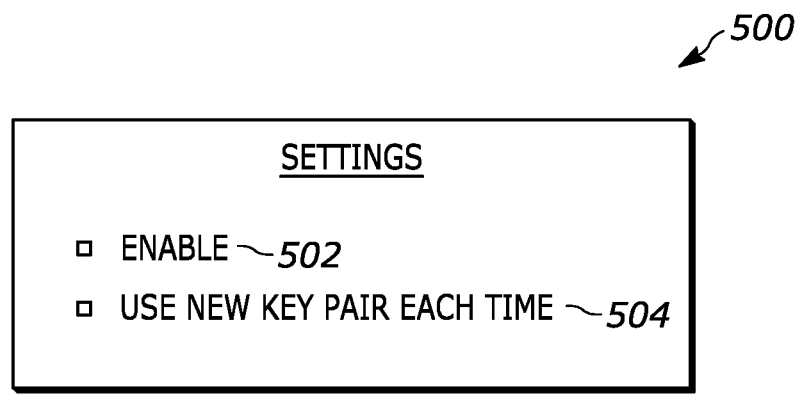
FIG. 5 is an example graphical user interface that may be presented on a display of a device to configure settings of the device to operate consistent with present principles.

Continuing the detailed description in reference to FIG. 5, it shows an example graphical user interface (GUI) 500 that may be presented on the display of a device configured to undertake present principles. For example, the GUI 500 may be presented on the display of an end-user device such as a device that is configured to execute the logic of FIG. 3. However, the GUI 500 may also be presented on another display being used by, e.g., a manufacturer or developer of the end-user's device to configure settings of the end-user's device prior to providing the device to the end-user.

As shown in FIG. 5, the GUI 500 may include a first option 502 that may be selectable by directing touch or cursor input to the adjacent check box in order to set or enable the end-user device to in the future undertake present principles. For example, the option 502 may be selected to set or configure the end-user device (and possibly its EC specifically) to execute the logic of FIG. 3 and/or perform other functions and actions described herein.

The GUI 500 may also include a second option 504 that may be selectable by directing touch or cursor input to the adjacent check box in order to set or enable the device's EC to use a new key pair (or multiple new key pairs) for each firmware update or update data set it receives to thus use new pair(s) each time for passing certificates, etc. between the EC and component to be updated as described above in reference to FIG. 3. So, for example, if the option 504 is not selected, the EC may repetitively use the same key pair(s) for each firmware update/settings update that is received by the device.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
at least one processor; and
storage accessible to the at least one processor and comprising instructions executable by the at least one processor to:
receive, at an embedded controller (EC), firmware update data, a first digital signature associated with a component at which the firmware update data is to be applied, and a first identifier that identifies the EC;
determine, at the EC and using the first digital signature, that the firmware update data has been received from the component;
determine, using the first identifier, that the EC is to act upon the firmware update data;
based on the determination that the firmware update data has been received from the component and based on the determination that the EC is to act upon the firmware update data, hash the firmware update data to render a first hash;
determine that the firmware update data has not been previously applied at the device based on the first hash not matching one or more other hashes already stored at the device;
based on the determination that the firmware update data has not been previously applied at the device, generate, using the EC, a first digital certificate comprising a second identifier and a second digital signature, wherein the second digital signature signs the firmware update data, and wherein the second identifier identifies the firmware update data;
based on the determination that the firmware update data has not been previously applied at the device, generate, using the EC, a second digital certificate comprising an indication identifying the component at which the firmware update data is to be applied and comprising a third digital signature signing the second identifier as coming from the EC; and
send the firmware update data, the first digital certificate, and the second digital certificate to the component to apply the firmware update data.

2. The device of claim 1, wherein the instructions are executable to:
send a key to the component, the key being usable by the component to validate the second and third digital signatures.

3. The device of claim 1, wherein the at least one processor comprises the EC.

4. The device of claim 1, wherein the instructions are executable to:
receive, at the component to which the firmware update data is to be applied, the first and second digital certificates; and
validate the second and third digital signatures as respectively indicated in the first and second digital certificates; and
responsive to validating the second and third digital signatures, apply the firmware update data at the component.

5. The device of claim 4, wherein the second and third digital signatures are both validated using the same key.

6. The device of claim 5, wherein the key is received from the EC.

7. The device of claim 4, wherein the instructions are executable to:
control the component to send the firmware update data, the first digital signature, and the first identifier to the EC for receipt by the EC.

8. The device of claim 1, wherein the EC comprises an application-specific integrated circuit (ASIC).

9. The device of claim 1, wherein the EC comprises a field-programmable gate array (FPGA).

10. The device of claim 1, wherein the firmware update data comprises an update to the firmware code executed by the component.

11. The device of claim 1, wherein the firmware update data comprises settings that are to be used by the component while executing firmware code for the component.

12. The device of claim 1, wherein the first digital certificate does not comprise the second digital certificate, and wherein the second digital certificate does not comprise the first digital certificate.

13. The device of claim 1, wherein the first digital certificate comprises a timestamp indicating a date and/or time at which the second digital signature was generated.

14. The device of claim 1, wherein the component is established by hardware of the device that is different from the EC.

15. A method, comprising:
receiving, at an embedded controller (EC) of a device, firmware update data for a component of the device and also receiving, at the EC, a first identifier that identifies the EC;
determining, at the EC and using the first identifier, that the EC is to act upon the firmware update data;
based on determining that the EC is to act upon the firmware update data, hashing the firmware update data at the EC to render a first hash;
determining, at the EC, that the firmware update data has not been previously applied at the device based on the first hash not matching one or more other hashes already stored at the device;
based on determining that the firmware update data has not been previously applied at the device, generating, using the EC, a first digital certificate comprising a second identifier and a first digital signature, wherein the first digital signature signs the firmware update data, and wherein the second identifier is associated with the firmware update data;
based on determining that the firmware update data has not been previously applied at the device, generating, using the EC, a second digital certificate comprising an indication identifying the component at which the firmware update data is to be applied and comprising a second digital signature signing the second identifier as coming from the EC; and
transmitting the firmware update data, the first digital certificate, and the second digital certificate from the EC to the component for the component to apply the firmware update data.

16. The method of claim 15, comprising:
receiving, at the EC, a third digital signature associated with the component as generated by the component;
determining, at the EC and using the third digital signature, that the firmware update data has been received at the EC from the component; and
based on determining that the firmware update data has been received at the EC from the component, hashing the firmware update data at the EC to render the first hash.

17. The method of claim 15, comprising:
generating, at the EC and after receiving the firmware update data, a key pair, wherein a first key of the key pair is used to generate the first and second digital signatures; and
transmitting a second key of the key pair to the component, the second key being different from the first key, the second key being usable to validate the first and second digital signatures.

18. The method of claim 15, wherein the firmware update data is first firmware update data that is different from second firmware update data received prior to the first firmware update data, the second firmware update data used to establish one of the one or more other hashes already stored at the device, the second firmware update data already being applied at the component prior to applying the first firmware update data.

19. At least one computer readable storage medium (CRSM) that is not a transitory signal, the computer readable storage medium comprising instructions executable by at least one processor to:
receive, at an embedded controller (EC) of a device, firmware update data for a component of the device and also receive, at the EC, a first identifier that identifies the EC;
determine, at the EC and using the first identifier, that the EC is to act upon the firmware update data;
based on determining that the EC is to act upon the firmware update data, hash the firmware update data at the EC to render a first hash;
determine, at the EC, that the firmware update data has not been previously applied at the device based on the first hash not matching one or more other hashes already stored at the device;
based on determining that the firmware update data has not been previously applied at the device, generate, using the EC, a first digital certificate comprising a second identifier and a first digital signature, wherein the first digital signature signs the firmware update data, and wherein the second identifier is associated with the firmware update data;
based on determining that the firmware update data has not been previously applied at the device, generate, using the EC, a second digital certificate comprising an indication identifying the component at which the firmware update data is to be applied and comprising a second digital signature signing the second identifier as coming from the EC; and
transmit the firmware update data, the first digital certificate, and the second digital certificate from the EC to the component for the component to apply the firmware update data.

20. The CRSM of claim 19, wherein the instructions are executable to:
receive, at the EC, a third digital signature associated with the component as generated by the component;
determine, at the EC and using the third digital signature, that the firmware update data has been received at the EC from the component; and
based on determining that the firmware update data has been received at the EC from the component, hash the firmware update data at the EC to render the first hash.

* * * * *